(12) United States Patent
Vollmerhausen

(10) Patent No.: US 10,885,828 B1
(45) Date of Patent: Jan. 5, 2021

(54) WAVEGUIDE DISPLAY

(71) Applicant: Richard H. Vollmerhausen, Lake Mary, FL (US)

(72) Inventor: Richard H. Vollmerhausen, Lake Mary, FL (US)

(*) Notice: Subject to any disclaimer, the term of this patent is extended or adjusted under 35 U.S.C. 154(b) by 0 days.

(21) Appl. No.: 16/725,788

(22) Filed: Dec. 23, 2019

(51) Int. Cl.
| | |
|---|---|
| *G09G 5/02* | (2006.01) |
| *G09G 3/20* | (2006.01) |
| *G09G 3/32* | (2016.01) |
| *G02F 1/225* | (2006.01) |
| *G02F 1/21* | (2006.01) |

(52) U.S. Cl.
CPC .......... *G09G 3/2003* (2013.01); *G02F 1/225* (2013.01); *G09G 3/32* (2013.01); *G02F 2001/212* (2013.01); *G09G 2320/0247* (2013.01); *G09G 2320/0295* (2013.01); *G09G 2320/0626* (2013.01); *G09G 2320/0666* (2013.01)

(58) Field of Classification Search
CPC .............. G09G 3/2003; G09G 3/32; G09G 2320/0247; G09G 2320/0666; G09G 2320/0295; G09G 2320/0626; G02F 1/225; G02F 2001/212
See application file for complete search history.

(56) References Cited

U.S. PATENT DOCUMENTS

| | | | |
|---|---|---|---|
| 9,575,341 B2 | 2/2017 | Heck et al. | |
| 10,345,519 B1* | 7/2019 | Miller | G02B 6/122 |
| 2003/0067760 A1* | 4/2003 | Jagt | G02B 6/0056 |
| | | | 362/606 |
| 2014/0063853 A1* | 3/2014 | Nichol | G02B 6/0028 |
| | | | 362/616 |
| 2015/0253487 A1* | 9/2015 | Nichol | G02B 6/0036 |
| | | | 362/610 |
| 2016/0091772 A1* | 3/2016 | Okamoto | G02B 27/017 |
| | | | 345/7 |
| 2018/0041743 A1* | 2/2018 | Ellwood, Jr. | G02F 1/09 |
| 2019/0170925 A1* | 6/2019 | Nichol | G02B 6/0028 |

OTHER PUBLICATIONS

B.E.A. Saleh and M.G. Teich,"Fundamentals of Photonics," published by Wiley,USA.
Koji Yamada et al., "Silicon Photonic Wire Waveguides: Fundamentals and Applications" published in Silicon Photonics, II, USA 2011.
Z. Lil, Myoung-Hwan Kim, C.Wang, A. Stein, A.M. Agarwa et al. ,"Controlling Propagation and Coupling of Waveguide Modes using phase-gradient Metasurfaces".

* cited by examiner

*Primary Examiner* — Adam R. Giesy
(74) *Attorney, Agent, or Firm* — Joseph Profeta

(57) ABSTRACT

This disclosure describes implementation of a display with resolution of one to ten million color pixels per square inch of display area. Fabrication in a CMOS foundry uses silicon waveguide technology. Red, green, and blue light are distributed via waveguide to all display pixels. Optical modulators in each pixel control image color and luminance. A photo diode is incorporated into each display pixels to enable uniformity correction of pixel luminance and color.

12 Claims, 4 Drawing Sheets

WAVEGUIDE DISPLAY

FIELD OF THE DISCLOSURE

The present disclosure relates to devices, systems, and methods for displaying high dynamic range color imagery with many pixels per inch of display area.

OBJECT OF THE INVENTION

There is a long felt need for small but high resolution color displays to be used for helmet mounted, eyeglass mounted, goggle mounted, mask mounted, or head mounted applications or for projection viewing. Head mounted applications require the display to be small and light and sufficiently bright for day viewing. The present invention uses a variety of waveguide components to implement small displays with one to ten million color pixels per square inch.

When viewed directly or using an eyepiece, the invention is a display. However, a lens can be used to project the invention's spatial image onto a screen, making the invention a projector.

The invention can also be used in a heads up display and other applications requiring a small but bright image source. Heads up displays project information like speed and direction as well as imagery on aircraft or automobile windows so that the operator can view the scene and instrument data simultaneously.

As an illuminator, the invention has the capability of projecting light to selected areas of the field of view; the invention is suitable for use as an illuminator for structured light imaging and ranging. Structured light imaging is the process of projecting a known pattern (often grids or horizontal bars) onto a scene. The scene is viewed with a camera. The way that the patterns deform when striking surfaces allows calculation of the range to objects in the scene.

The invention described in this specification can be used in any spectral band from visible through mid-wave infrared as a display, as a spatial modulator, or as an illuminator for active imaging.

A further object of the invention is production at a reasonable cost. Any photonic (optronic and electronic) fabrication technology can be used to implement this invention. Currently, silicon foundries provide the most convenient and least expensive fabrication of photonic circuits. The examples in this disclosure describe implementation on silicon or silicon on insulator (SOI) wafers using complementary metal oxide semiconductor (CMOS) processes.

Although the waveguide components and their functionality are known to those in the waveguide art, the present invention uses the components to combine and assemble them in a novel, non-obvious display system that offers significant advantages.

This invention uses any type of waveguide suitable for conveying light. However, the description and examples in this specification employ strip (also known as rectangular) waveguides. When used as a color display, the likely waveguide material is either silicon nitride or lithium niobium oxide. However, the invention can employ silicon waveguides, polymer waveguides or waveguides made from other materials.

Further, neither waveguides nor basic electronic transistor logic require crystal silicon for operation. Amorphous silicon growth can be used to fabricate waveguide displays if desired for cost or other purposes like the creation of Bragg reflective layers. Amorphous silicon fabrication of waveguide displays can also be used to fabricate non-planar displays. The processes used for solar cell production or active matrix display production can also be used to fabricate waveguide displays.

BACKGROUND OF THE INVENTION

U.S. Pat. No. 9,575,341 B2 issued Feb. 21, 2017 to Heck et al., and assigned to Intel Corporation, is a photonics circuit with a liquid crystal layer (LCL) applied in order to use the interaction of the LCL to control the phase of the waveguided light and steer optical beams to create a non-mechanical LIDAR scanner. The Intel invention is a beam steering device and does not apply, nor does it have a means to apply, pixel by pixel intensity controls to create a display. While the Intel invention and the invention described here, both use waveguides embedded in photonics circuits, the generic photonics components are assembled differently in each invention to implement a different function. Namely, Intel does beam steering with the illuminator providing pulsed or chirped light for ranging, while the current invention processes light to implement a display system, to be used as a display, as a spatial modulator, or for active imaging. The spatial modulator, as in the current invention, is used as a display, and may also be used as an illuminator for structured light ranging. The function and the implementation in the Intel patent and in the current invention are different. Aside from both using waveguides, there is no similarity in implementation or in intended function between the Intel patent and the invention described here.

The invention described in this specification depends heavily upon waveguide tools and components developed by the research community for the communications industry. The prior waveguide art is too diverse and has too many varieties to list. However, general references on the technology include: (i) B. E. A. Saleh and M. C. Teich, *Fundamentals of Photonics*, published by Wiley; (ii) *Silicon Photonic Wire Waveguides: Fundamentals and Applications* in Silicon Photonics II, 2011; (iii) Z. Lil, Myoung-Hwan Kim, C. Wang, Z. Han, S. Shresthal, A. C. Overvigl, M. Lu, A Stein, A M. Agarwa, M. Loncar, and N. Yul, *Controlling Propagation and Coupling of Waveguide Modes using phase-gradient Metasurfaces*, Nature Nanotechnology, Vol. 12, 2017.

Photonic researchers have developed processes to capture light into waveguides, distribute that light using waveguide splitters and combiners, control the intensity and wavelength of light in a waveguide, and radiate light from a surface. The goal of waveguide researchers has been to develop wavelength division multiplexing for communication links. In contrast, this disclosure describes how to interconnect waveguide components to process light and implement an imaging display.

Implementation of an imaging display requires circuitry for such functions as synchronization, global or progressive shutter logic, row and column data input and latching, digital-to-analog conversion, and display format conversion, just to name some of the necessary functions. Design solutions for circuits and other means of implementing those functions, and the additional functions required for display, are well known to experts skilled in the camera and display art. This disclosure focuses on teaching and instructing waveguide display implementation methods to those already expert in display design. Therefore, many elements necessary to design a fully functional display are not described in detail.

The known waveguide art is too diverse and has too many varieties to list, but the availability and conventional functionality of the waveguide components are known to those skilled in the waveguide art. There are multiple known means of addressing each of the main functions required to implement a waveguide display. Those functions include but are not limited to: coupling light into the photonics circuit, light distribution around the display, optical modulation to control pixel intensity and color, and irradiating light from each pixel. The examples and descriptions in this disclosure use specific waveguide components for each function in order to illustrate feasibility and to explain methods of implementation. The waveguide display invention is not tied to the means of implementing any one display function.

Display light is provided by one or more light emitting diodes (LED) or laser diodes for each color blue, green, and red light. In this disclosure, LED represents either light emitting diodes or laser diodes.

For descriptive clarity, the primary colors used to render a color image are labeled blue, green, and red. The three colors constituting a color image need not be blue, green, and red; there are many suitable color triads (many usable color combinations). Nonetheless, in this disclosure, a color image is referred to as a combination of blue, green, and red light, and those colors are stand-ins for any suitable color triad.

BRIEF DESCRIPTION OF THE DRAWINGS

FIG. 2 is a side view of a BG showing waveguide, emitting structure, and Bragg Reflector surfaces to improve the efficiency of the grating.

DESCRIPTION OF THE PREFERRED EMBODIMENT

Figure 1:
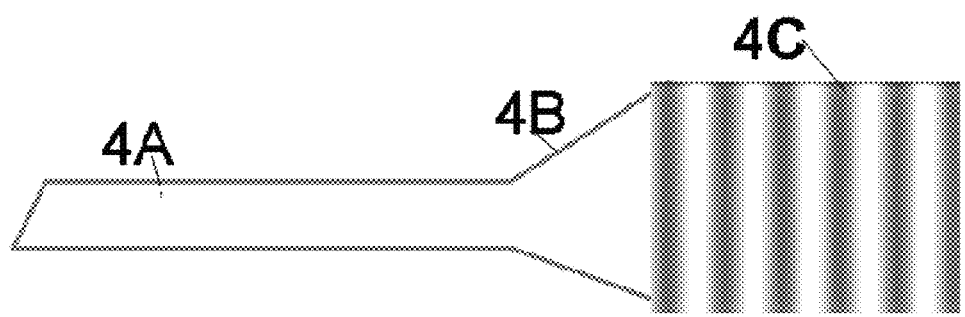
FIGS. 1 and 2 illustrate Bragg Gratings (BG) used as optical couplers and as radiators of light.

A more complete understanding of these embodiments, and the attendant advantages and features thereof, will be more readily understood by reference to the following detailed description when considered in conjunction with the accompanying drawings. The drawings described herein are shown only for illustrative purposes. Not all possible apparatus configurations are included and the embodiments shown are not intended to limit the scope of the present invention.

The invention has the potential to be configured in multiple versions so as to generate superior technical performance in any given application. Therefore, it is understood that in some configurations not all elements will always be necessary for the specific embodiment or implementation of the invention. It should also be apparent that there is no restrictive one-to-one correspondence between any given embodiment of the invention and the elements in the drawing.

For clarity and in order to emphasize certain features, all of the invention features are not shown in the drawing, and all of the features that might be included in the drawing are not necessary for every specific embodiment of the invention. The invention also encompasses embodiments that combine features illustrated in the drawing; embodiments that omit, modify, or replace some of the features depicted; and embodiments that include features not illustrated in the drawing.

As used herein, relational terms, such as "first" and "second," "top" and "bottom," and the like, may be used solely to distinguish one entity or element from another entity or element without necessarily requiring or implying any physical or logical relationship or order between such entities or elements.

The drawing is integral to the specification and is included to illustrate the apparatus.

Embodiments of the present disclosure will be described more fully hereinafter with reference to the accompanying drawings in which like numerals and numerals appended with letters represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Any reference to "invention" or the specific invention name "waveguide display" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities, dimensions, spatial characteristics, compositional characteristics and performance characteristics may be used explicitly or implicitly herein, but such specific quantities are presented as examples only and are approximate values unless otherwise indicated. Discussions and depictions pertaining to these, if present, are presented as examples only and do not limit the applicability of other characteristics, unless otherwise indicated. 33. In describing preferred and alternate embodiments of the invention, specific terminology is employed for the sake of clarity. The technology described herein, however, is not intended to be limited to the specific terminology so selected, and it is to be understood that each specific element includes all technical equivalents that operate in a similar manner to accomplish similar functions.

The drawings use a combination of electrical symbols, logic symbols and pictorial representations to illustrate the elements of the invention. In the interest of clarity, the symbols are simplified and do not explicitly show unneeded detail.

Example embodiments will now be described more fully with reference to the accompanying drawings of the invention. Specific details are set forth such as examples of specific components and methods to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known device structures are not described in detail.

The invention has the potential to be configured in multiple versions so as to generate superior technical performance in any given application. Therefore, it is understood that in some configurations not all elements will always be necessary for the specific embodiment or implementation of the invention. It should also be apparent that there is no restrictive one-to-one correspondence between any given embodiment of the invention and the elements in the drawing.

Figure 2:
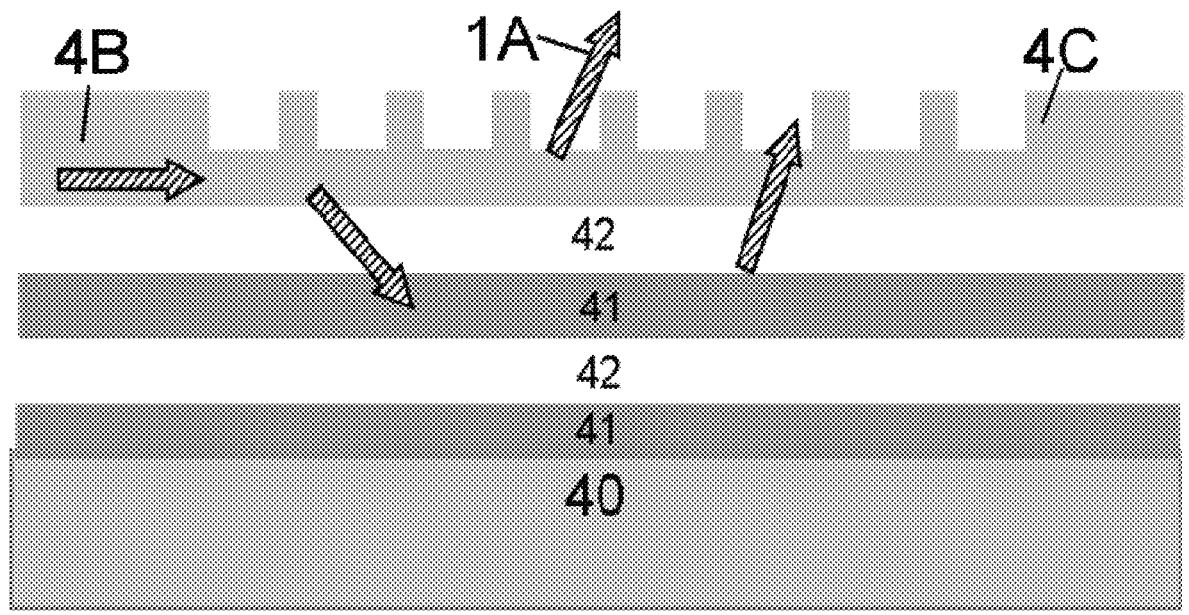

FIGS. 1 and 2 illustrate the operation of Bragg Gratings (BG) that collect and emit light. Other waveguide configurations can serve as light couplers and emitters. For example, light can be expanded by a wedged shaped waveguide and emitted from a tapered optical coupler etched into the silicon or silicon nitride material. BGs are used as examples to show feasibility and to illustrate functionality.

FIGS. 1 and 2 illustrate the operation of Bragg Gratings (BG) that collect and emit light. Other waveguide configurations can serve as light couplers and emitters. For example, light can be expanded by a wedged shaped waveguide and emitted from a tapered optical coupler etched into the silicon or silicon nitride material. BGs are used as examples to show feasibility and to illustrate functionality.

FIG. 1 illustrates a BG viewed from the top. The surface 4C collects or radiates light; BGs are bidirectional and can act as emitters of light from waveguides or as couplers of light into waveguides. A taper 4B efficiently couples light from the collector 4C to a waveguide 4A.

FIG. 2 shows a side view of a BG. The arrows IA indicate light direction as radiating from the BG surface. The light can also be collected, and the arrows would point the other direction. The grating area 43 causes light to radiate from the waveguide 4A, but light radiates in either direction (that is, up or down in the figure). The silicon wafer 40 can be doped in layers (41, 42, 41, 42) to create a Bragg Reflector. The reflector improves efficiency by reflecting the light up (in the figure) out of the device.

BG are one means used in the invention to collect light from LED and to radiate light from each pixel.

Figure 3:
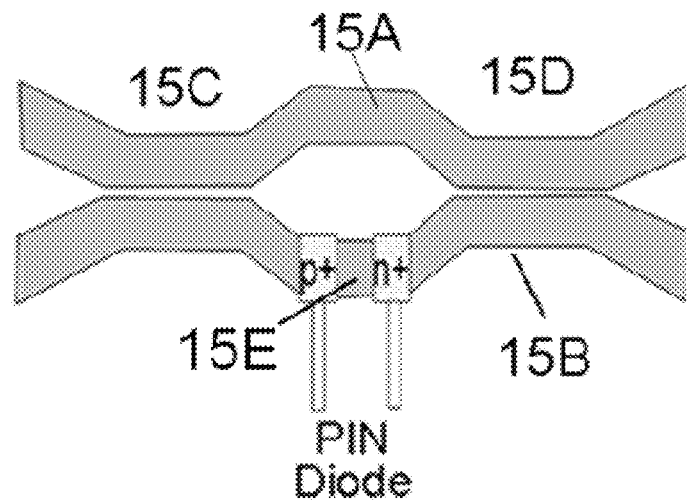
FIG. 3 illustrates the operation of a Mach Zehnder Interferometer (MZI) as an optical modulator (OM).

FIG. 3 illustrates an MZI, item 15, used as an OM. Light enters waveguide ISA (for example). As the light passes the waveguide narrow region 15C, evanescent coupling occurs between the two waveguides 15A and 15B, and half the light couples to 15B. The light in 15B is 90 degrees out of phase with the light in 15A. At the next waveguide narrow region 15D, evanescent coupling again occurs. If the light in the two waveguides is still 90 degrees apart (90 degree phase shift relative to each other), then all of the light exits the MZI 15 from waveguide 15B (the bottom waveguide in the figure). If the phase between the light in the waveguides is 270 degrees, then all of the light exits waveguide ISA (the top waveguide in the figure). At other phases differences, the light is divided depending on phase. By controlling phase, any fraction of the input light can be directed to output at ISA (the top waveguide) or 15B (the bottom waveguide).

Waveguide 15B is made slightly shorter than 15A and a PIN diode ISE is embedded in waveguide 15B. By passing a forward current through the PIN diode 15E, the optical path length in 15B is slightly lengthened, with the amount of lengthening dependent upon the current passed through the diode 15E. The current in the PIN diode ISE then controls the phase difference of the light in the two waveguides 15A and 15B. The light will exit waveguides 15A and 15B in fractional amounts that depend on the current passed through ISE.

An MZI 15 with a PIN diode ISE, is not the only way known to experts in waveguide fabrication for controlling light intensity. For example, one leg of the MZI can be differentially heated; changing temperature changes the silicon refractive index and therefore changes optical path length and differential phase. Another option for controlling light intensity is using two tapered light couplers and controlling output intensity by changing coupler alignment using temperature.

Both color and intensity of a display pixel are controlled by using, for example, three MZIOMs to independently adjust the intensity of blue, green, and red light radiated from a pixel.

Figure 4:
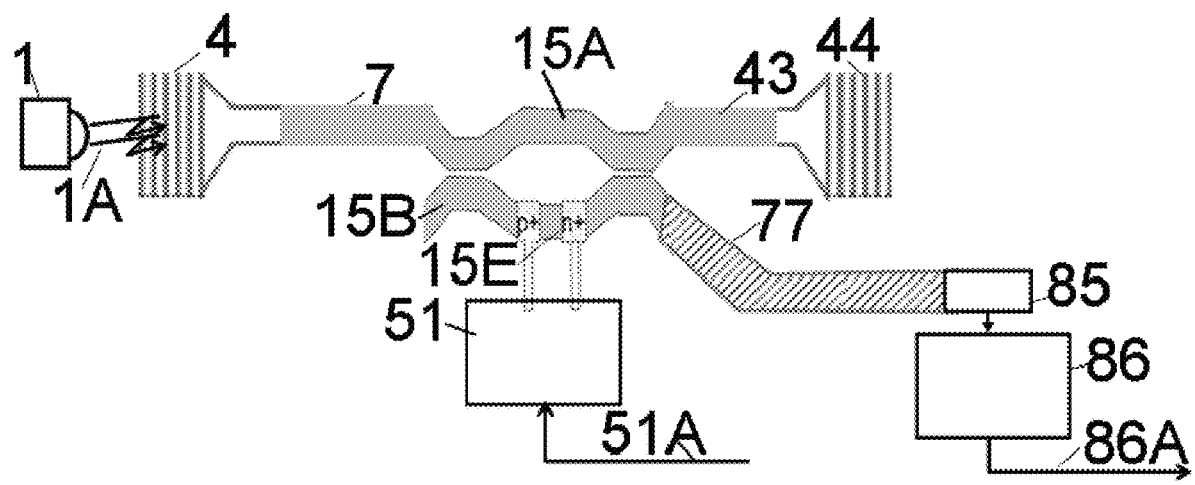
FIG. 4 illustrates the path of the light from an LED light source to the final radiation from a display pixel.

FIG. 4. shows the path that one color of light takes from source LED I to pixel radiator BG 44. LED item I emits light IA that is collected by BG 44 and coupled into distribution waveguides 7. In each pixel 10, the intensity of each color is adjusted by an OM item 15. A digital circuit (not shown) receives display data and generates signal on a buss or control line 5 IA for each pixel and each color. In each pixel, circuit 51 maintains the PIN diode ISE current such that the correct amount of light exits MZI 15 through waveguide 43 to be radiated by BG item 44.

Light that does not go to the BG radiator 44 is coupled through waveguide item 77 to photo diode item 85. Circuit item 86 samples, amplifies, and stores for readout the photo diode signal. Output signal labeled 86A is read periodically, digitized, and used to determine the relationship between the signal on control line or buss 5 IA and the fraction of light directed by the OM item 15, to waveguides 43 and 77.

Although this invention disclosure emphasizes two dimensional displays, sometimes a one dimension linear array of light emitting pixels is useful. The implementation of a one dimension array follows the same implementation as a two dimensional array of pixels.

Figure 5:
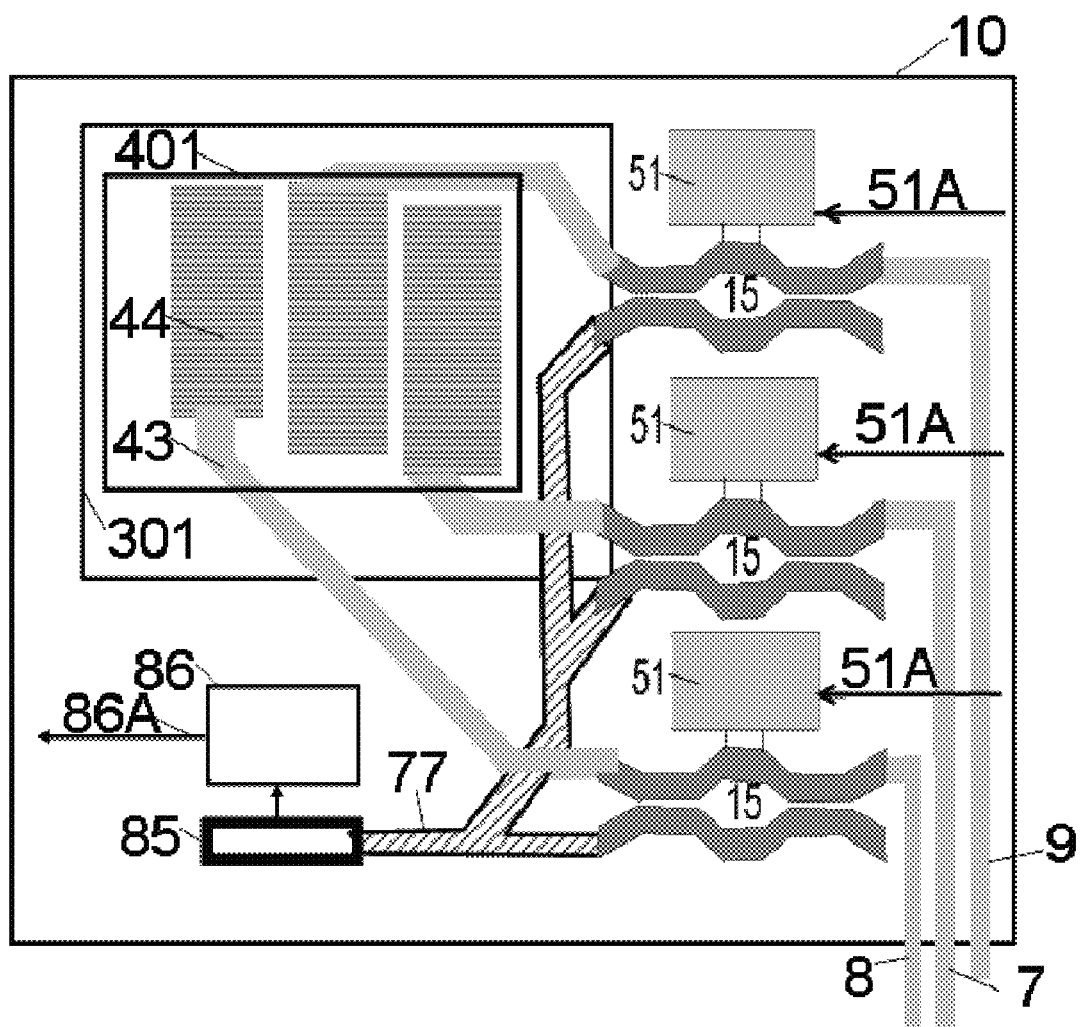
FIG. 5 shows the layout of a color pixel.

FIG. 5 illustrates one pixel item IO including OM item 15 and BG item 44 for all colors. Red, green, and blue light is distributed to all pixels via waveguides 7, 8, and 9. Each color connects to an OM item 15 and each OM is controlled by a circuit item 51 with input on buss or control line 5 IA. As an example, light from waveguide 8 is directed according to the signal on buss or control line 5 IA to either waveguide 43 or waveguide 77, and that signal establishes the amount of green light emitted from the pixel, item 10. The outline 301 indicates presence of a Bragg Reflector to enhance efficiency. The outline 401 surrounds an open area not covered by metallization, that is, most of the pixel 10 is covered by metal. The Bragg Reflector and metallization are included to minimize pixel-to-pixel cross-talk (that is, light leakage between pixels).

In FIG. 5, the BG radiators, item 44, can be replaced by a variety of optical couplers that have been demonstrated by communications researchers.

A single color version of the waveguide display is used as a monochrome display or illuminator for active or structured light imaging.

The light from all OM 15 is conveyed via waveguide 77 to a photo detector, with output amplifier and buffer circuit 86 and signal output 86A. The photo diode signal 86A is collected by a digital processor and used to ensure pixel-to-pixel luminance uniformity.

Figure 6:
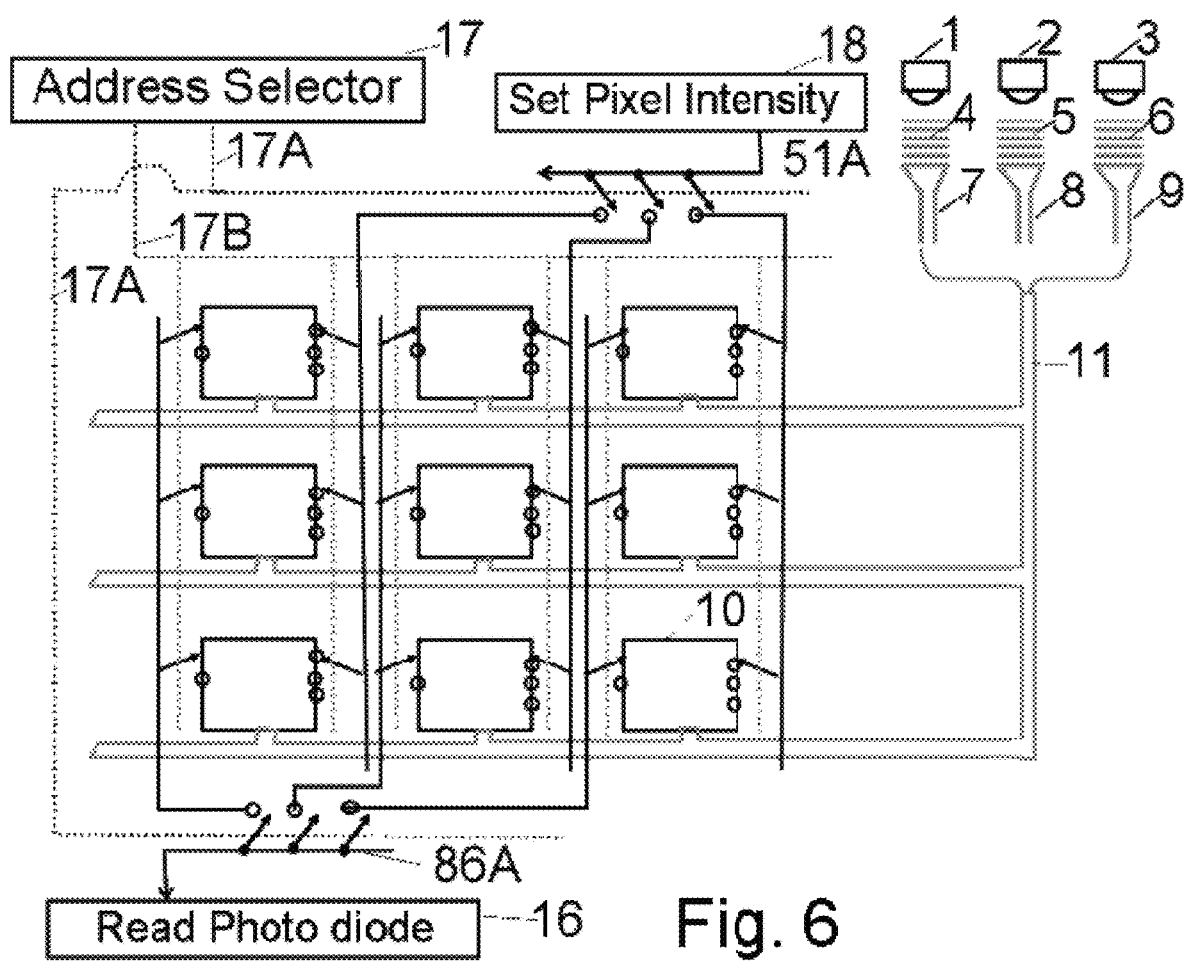
FIG. 6 illustrates pixel addressing, setting pixel luminance intensity, and reading photo diode signals.

FIG. 6 illustrates one method of interconnecting and addressing a two dimensional array of display pixels. The display has N by M pixels (item I 0), only nine of which are illustrated. Light is provided to the display pixels 10, by one or more LED items 1, 2, and 3, one or more LED for each color blue, green, and red light, respectively.

As illustrated in FIG. 6, each the three colors of LED light is incident upon BG 4, 5, and 6 with a wide to narrow coupler on the output of the BG 4, 5, and 6, to transition from the multi-mode light input to the single mode light into waveguides 7, 8, and 9. Efficient coupling of the LED light into a single mode waveguide can require long couplers. These BG couplers are to one side of the photonics chip and limited in number.

In the drawings, separate waveguides are used to distribute the three light colors to each pixel. A single waveguide can be used for multiple colors by combining light from different color LED at the input and using phase gradient metasurfaces to separate out the colors at each pixel. Using fewer waveguides to distribute light requires less area but increases the complexity of the photonics layout. These types of design decisions are made during the engineering phase of development by those skilled in the waveguide design art.

A number of options besides BG exist to couple light into the invention. For example, the LED can be fiber optically pigtailed, and the pigtailed fiber exposed and butt coupled to a waveguide. Alternatively, a lens is used to focus light onto either a lensed coupler, a waveguide, or BG. Researchers have also developed special shapes etched into silicon to efficiently couple the LED light into photonics circuits.

The three colors of light in waveguides 7, 8, and 9 are all distributed to all pixels TO in the N by M two dimensional array. In FIG. 6, item 11 represents all three waveguides 7, 8, and 9.

In FIG. 6, circuit 17 depicts address selector logic using control lines (address busses) 17A and 17B to select columns and rows respectively.

Circuit 18 provides signals on control lines or buss SIA to each address-selected pixel I 0, to control the intensity of each color blue, green, and red light radiated from that pixel 10.

Circuit 16 is optional and reads the signal on 86A from one or more photo detectors that are included in each pixel 10. The photo detectors are used to ensure display luminance and color uniformity; the photo detectors are not necessary for display operation.

The address logic shown in FIG. 6 is that each pixel 10, is selected independently by row and column. The signal on buss or control lines SIA sets the independent intensity of each color red, green, and blue.

Average display brightness and color temperature can be set by operating each color LED light source 1, at less than a 100% duty cycle. The LED light sources 1, 2, and 3 are pulsed rapidly to avoid flicker. The brightness of each LED may be controlled by controlling the current through the LED, or by using a temporal brightness control.

What is claimed is:

1. A display comprising one or multiple light sources, each light source producing a light, wherein the light is coupled to a photonic device, said photonic device using waveguides to distribute said light to an array of light emitting pixels, each pixel functioning as a light radiator, with the intensity and the color of light radiated from each pixel controlled by optical switches, wherein: a) the light source comprising one or several light emitting diodes is pigtailed to a fiber optic, b) said fiber optic is butt-coupled to the photonic device via tapered wedge or wedges that are integrated with the photonic device, c) the photonic device further comprises separate distribution waveguides to convey red, green, and blue light to each light emitting pixel, d) each of the pixels further comprises Bragg Gratings as light radiators, one for each color light, e) the intensity of the light radiated through each of the said Bragg Gratings is controlled by one or more Mach Zehnder Interferometers (MZI) used as optical switches which are placed between the light distribution waveguides and the Bragg Gratings, f) each of the pixels further comprising a photo diode connected to additional MZI outputs that do not feed the Bragg Gratings, to control uniformity by sensing the light not switched to the Bragg Gratings, and g) each of the pixels further comprises electronics to sense the photo diode signal and control the MZI switch state or states.

2. The display of claim 1 further comprising Bragg Reflector surfaces to enhance efficiency.

3. The display of claim 1 further comprising metallization to reduce crosstalk and suppress light not radiated by the optical radiators.

4. The display of claim 1 using optical coupling devices to input light from a source into the distribution waveguides, wherein the optical coupling device uses a lens.

5. The display of claim 1 using an optical coupling device to input light from a source into the distribution waveguides, wherein the optical coupling device uses a wedge.

6. The display of claim 1 where the light from the light sources is coupled through a single waveguide onto the photonic device and its colors are distributed together to each pixel in the array by means of nano spectral filtering devices to separate the light into red, green, and blue at each pixel.

7. The display of claims 1 and 6 where both the color and the intensity of the light from the light sources are controlled by multiple MZIs placed serially in the light chain.

8. The display of claim 1, wherein a single Bragg Grating and MZI are used to generate monochromatic imagery.

9. The display of claim 1, wherein the pixel array is a linear array.

10. The display of claim 1, wherein the pixel array is two dimensional.

11. The display of claim 1, wherein each MZI controls the intensity and color of the light through a single Bragg Grating by on-off switching whereby light intensity is controlled by varying the on-duty-cycle.

12. The display of claim 1, wherein the light source is time modulated in order to enhance display dynamic range.

* * * * *